Jan. 8, 1924.
1,479,972
A. T. STURT ET AL
CLUTCH COLLAR
Filed Aug. 17, 1921    2 Sheets-Sheet 1
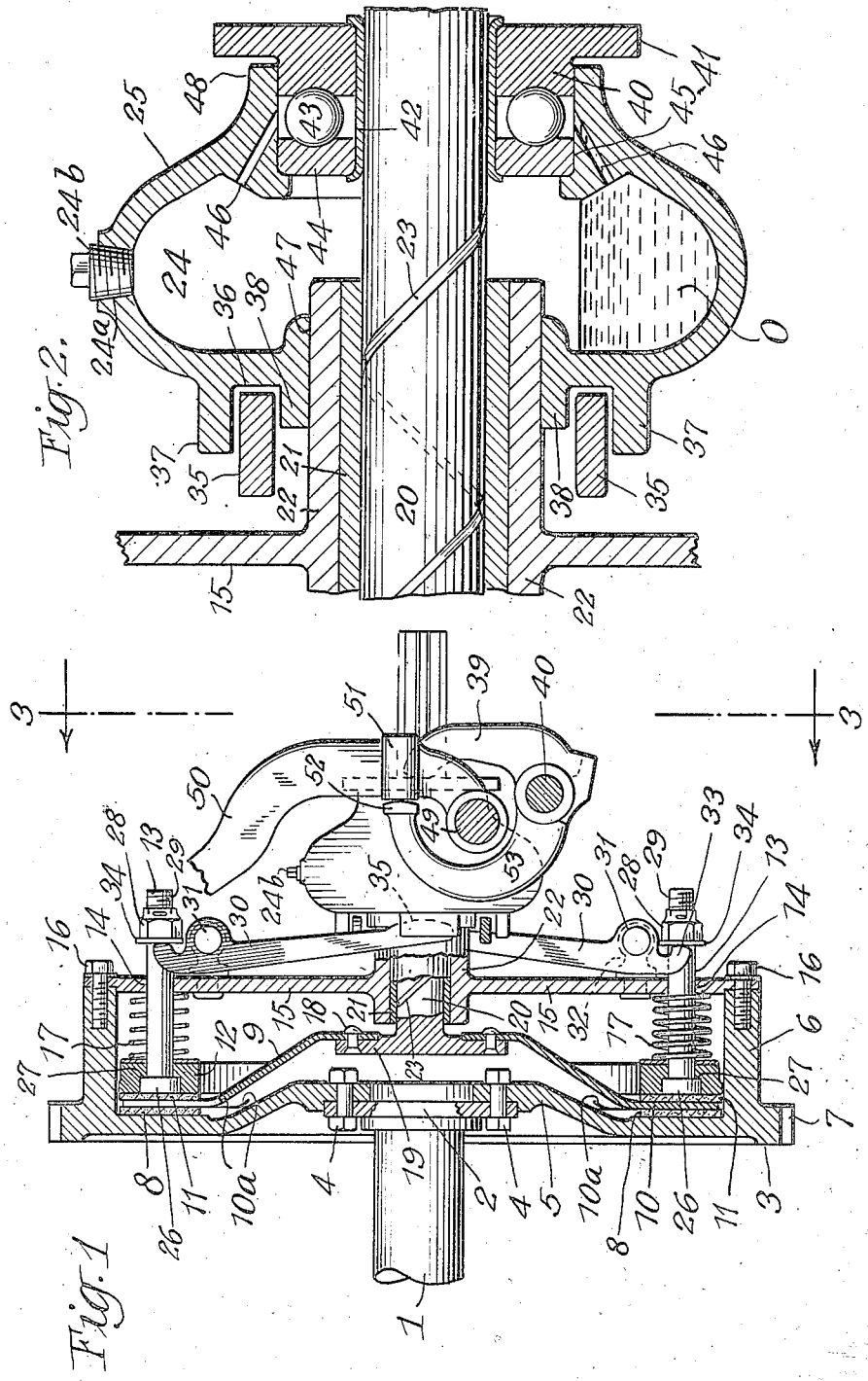
INVENTORS
Alfred T. Sturt
George H. Robinson
BY
Cornelius C. Billings
ATTORNEY Jan. 8, 1924.
A. T. STURT ET AL
1,479,972
CLUTCH COLLAR
Filed Aug. 17, 1921  2 Sheets-Sheet 2
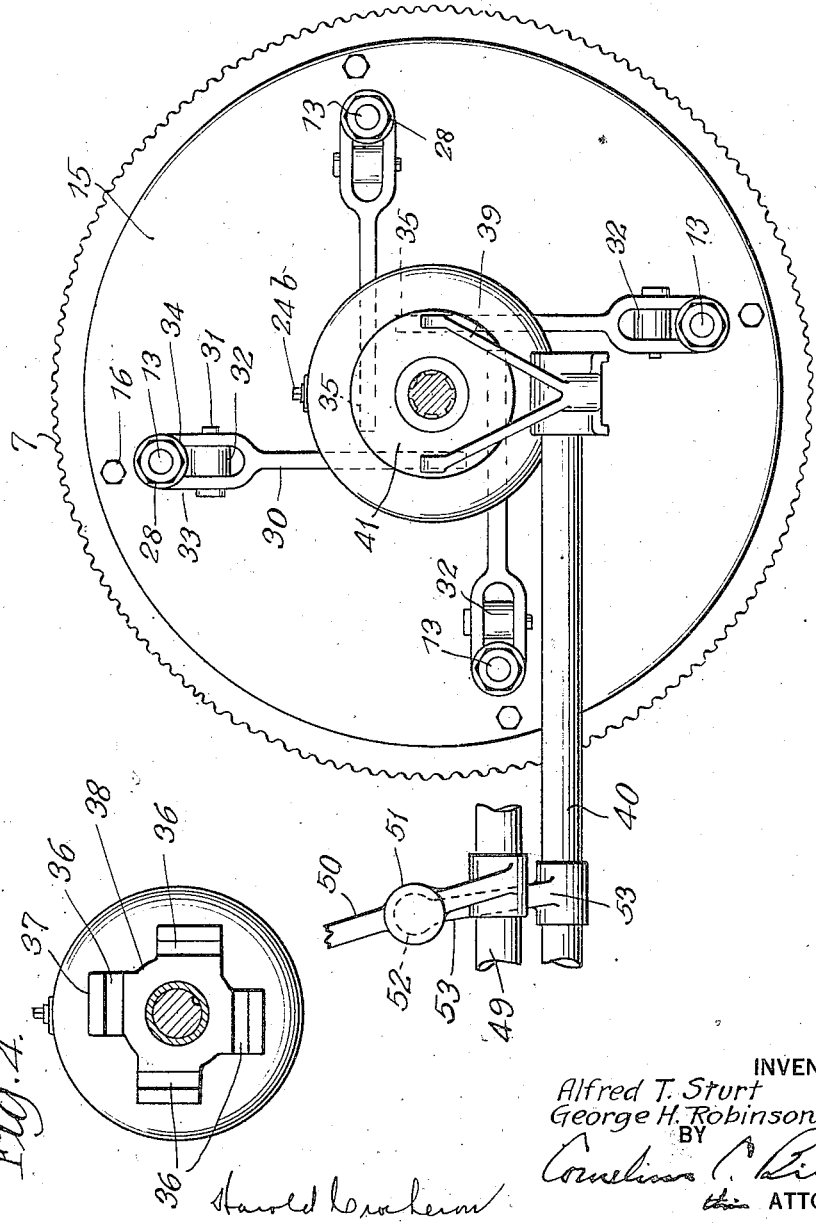
INVENTORS
Alfred T. Sturt
George H. Robinson
BY
ATTORNEY Patented Jan. 8, 1924.

1,479,972

UNITED STATES PATENT OFFICE.

ALFRED T. STURT, OF FLINT, MICHIGAN, AND GEORGE H. ROBINSON, OF NEW YORK, N. Y., ASSIGNORS TO DURANT MOTORS INCORPORATED, A CORPORATION OF DELAWARE.

CLUTCH COLLAR.

Application filed August 17, 1921. Serial No. 492,950.

*To all whom it may concern:*

Be it known that we, ALFRED T. STURT and GEORGE H. ROBINSON, citizens of the United States, and residents, respectively, of Flint, county of Genesee, State of Michigan, and borough of Manhattan, city and State of New York, have jointly invented certain new and useful Improvements in Clutch Collars, of which the following is a specification.

This invention relates to clutch operating mechanism and particularly to an improved type of a slidable clutch collar of hollow formation adapted to contain a lubricant which can be replaced from time to time to insure that this part shall at all times receive copious lubrication.

The objects and advantages of the invention will be apparent from the following description when read in connection with the accompanying drawings in which:

Fig. 1 is a side elevation with parts in section showing a clutch assembly, the improved clutch collar and the operating mechanism thereof.

Fig. 2 is a detail in vertical section showing the hollow clutch collar and related parts.

Fig. 3 is a transverse section on line 3—3 of Fig. 1.

Fig. 4 is a front view of the clutch collar.

In the drawings 1 represents the rear end of an engine crank-shaft which is formed with a flange 2 to which the fly wheel 3 is secured by bolts 4 passing through suitable holes in the web 5 of the fly wheel. The fly wheel is formed with a rearwardly extending annular flange 6 and outer gear teeth 7 for co-action with the starting motor. The inner face of the web 5 is lined with a loosely fitting ring of friction material 8 which with the fly wheel constitutes one element of the clutch. The other element comprises a dished clutch disc 9 having a flattened circular portion 10, the front face of which bears against the friction ring 8. A plurality of saw kerfs 10ª are formed in the disc 9 to give it resiliency and insure smooth operation of the clutch. The rear face of the disc 9 bears against another friction ring 11 and behind said ring is the pressure ring 12 which is carried by a plurality of studs 13 which pass loosely through holes 14 in the wall of the clutch cover plate 15. This plate is secured to the fly wheel by bolts 16 which are screwed into the flange 6 thereof. Springs 17 are associated with each of the several studs 13 and normally exert a pressure against the pressure ring 12 so as to keep the clutch disc 9 in driving engagement with the fly wheel. The disc 9 is secured near its center by rivets 18 to a flange 19 of a transmission shaft 20 which passes through a bushing 21 carried by a hub 22 integral with the cover plate 15. An oil groove 23 is formed in the shaft 20 and communicates with the interior chamber 24 of the clutch collar 25 as best shown in Fig. 2. An opening 24ª is provided for the introduction of a lubricant O to the chamber 24 and a removable plug 24ᵇ normally closes said opening. The several studs 13 are provided at their inner ends with heads 26 which engage the shoulders 27 of the pressure ring 12. The outer ends of said studs carry nuts 28 which are screwed onto the threaded ends 29 of the studs and locked in position by suitable cotter pins as shown. Dogs 30 are pivoted at 31 to fittings 32 secured to the clutch cover 15 as shown. These dogs are formed with bifurcated ends 33 which straddle the studs 13 and engage flanges 34 formed on the nuts 28. The ends 35 of the dogs fit in grooves 36 formed between the lugs 37 and hub 38 of the clutch collar 25. The arrangement is such that when the clutch collar 25 is moved to the left the dogs 30 will be rocked so that the studs 13 will move the pressure ring 12 to the right and thereby disengage the disc 9 from the fly wheel 3. The clutch collar is moved forward by a yoke 39, the free ends of which engage a flanged member 41 of a thrust bearing 40. This bearing comprises the flanged member 41, bushing 42, balls 43 and a collar 44. The collar 25 is formed with a bore 45 in which the bearing is loosely fitted and oil ducts 46 which communicate with the interior chamber 24 and the bore 45 to provide for generous lubrication of the thrust bearing. The front hub 38 of the clutch collar 25 is bored at 47 to loosely fit over the hub 22 of the clutch cover plate 15 and the rear hub 48 of said clutch collar is supported on the thrust bearing 40 which in turn is carried by the bushing 42 slidably mounted on the shaft 20. As thus constructed it is clear that the oil O in the chamber will be splashed about in the chamber 24 and will flow through the ducts 46 to generously lubricate the thrust bearing 40 and will also flow through the groove 23 to provide ample lubrication between the shaft 20 and bushing 21.

A film of oil will also be deposited on the outer surface of the hub 22 to maintain good lubrication between said hub and the hub 38 of the collar.

The clutch collar may be moved in any suitable manner to disengage the clutch, the drawings showing one arrangement comprising a clutch pedal 50 carried by a shaft 49 which is mounted on any suitable part of the chassis. The pedal has a lug 51 which bears against the end 52 of a curved lever 53 which is secured to the same shaft 40 which carries the yoke 39 above referred to.

From the foregoing it is clear that when the pedal 50 is pushed to the left it will rock the shaft 40 and cause the yoke 39 which bears on the flange 41 of the thrust bearing, to force the clutch collar 25 to the left. This action will rock the dogs 30 and cause the pressure ring 12 to move to the right thus removing the friction between the disc 9 and the friction ring 8 thus disengaging the driving connection between the crank shaft 1 and the transmission shaft 20.

While we have described quite specifically the details of the embodiment shown, it is not to be understood that we are limited thereto as changes in arrangement and substitution of equivalents may be made without departing from the invention as described in the appended claims.

Having thus described our invention what we claim as new and desire to secure by Letters Patent is:

1. In a clutch structure a driving element and a driven element, a power transmission shaft secured to the driven element and a clutch collar in slidable engagement with the driving element and the transmission shaft, the said collar having a chamber formed therein for holding a lubricant which is adapted to be splashed onto the bearing surfaces.

2. In a clutch structure a driving element and a driven element, a power transmission shaft secured to the driven element and a clutch collar having an anti-friction thrust bearing mounted therein, said clutch collar and thrust bearing being slidable relatively to the driven element, and the transmission shaft, said clutch collar having an annular chamber formed therein surrounding and open to said transmission shaft adapted to contain a lubricant and conduits communicating with said chamber for conveying the lubricant to the thrust bearing.

3. In a clutch structure a driving element and a driven element, a power transmission shaft secured to the driven element and a hub carried by the driving element forming a bearing for said transmission shaft, a clutch collar in sliding engagement with the outer surface of said hub, said collar having a chamber formed therein for holding a lubricant which is adapted to be splashed on said hub.

4. In a clutch structure, a driving element and a driven element, a power transmission shaft secured to the driven element and a hub carried by the driving element forming a bearing for said transmission shaft, a clutch collar in sliding engagement with the outer surface of said hub, said collar having a chamber formed therein for holding a lubricant which is adapted to be splashed on said hub, said clutch collar also carrying a thrust bearing which is slidable on said transmission shaft and having conduits communicating with said chamber for conveying the lubricant to the thrust bearing.

5. In a clutch structure, a driving element and a driven element, a power transmission shaft secured to the driven element and a clutch collar having a chamber formed therein adapted to contain a lubricant, said clutch collar being slidable relatively to the driven element and the transmission shaft, said collar having a bearing formed in one wall of said chamber mounted on said driving element and a thrust bearing in the opposite wall of said chamber, mounted on said transmission shaft, said bearings being adapted to receive lubricant from said chamber.

6. In a clutch structure, a driving element and a driven element, a power transmission shaft secured to the driven element and a clutch collar having a chamber formed therein adapted to contain a lubricant, said clutch collar being slidable relatively to the driven element and the transmission shaft, said collar having a bearing formed in one wall of said chamber mounted on said driving element and a thrust bearing in the opposite wall of said chamber mounted on said transmission shaft, a helical groove on said transmission shaft communicating with said chamber, said groove and said thrust bearing being arranged to receive lubricant from said chamber.

Signed this 9th day of August, 1921.

ALFRED T. STURT.
GEORGE H. ROBINSON.